(12) United States Patent
Lee et al.

(10) Patent No.: US 11,260,393 B2
(45) Date of Patent: Mar. 1, 2022

(54) DIGITAL PCR DEVICE AND METHOD USING CENTRIFUGAL FORCE

(71) Applicant: REVOSKETCH CO., LTD., Daejeon (KR)

(72) Inventors: Sung Woon Lee, Daejeon (KR); Ho Chul Nam, Daejeon (KR)

(73) Assignee: Revosketch Co., Ltd.

( * ) Notice: Subject to any disclaimer, the term of this patent is extended or adjusted under 35 U.S.C. 154(b) by 140 days.

(21) Appl. No.: 16/605,453

(22) PCT Filed: Jan. 4, 2018

(86) PCT No.: PCT/KR2018/000163
§ 371 (c)(1),
(2) Date: Oct. 15, 2019

(87) PCT Pub. No.: WO2018/194240
PCT Pub. Date: Oct. 25, 2018

(65) Prior Publication Data
US 2021/0121886 A1 Apr. 29, 2021

(30) Foreign Application Priority Data
Apr. 17, 2017 (KR) .......................... 10-2017-0048901

(51) Int. Cl.
*B01L 7/00* (2006.01)
*G01N 21/64* (2006.01)
*G01N 35/00* (2006.01)

(52) U.S. Cl.
CPC ............ *B01L 7/52* (2013.01); *G01N 21/6428* (2013.01); *G01N 35/00029* (2013.01);
(Continued)

(58) Field of Classification Search
CPC .... B01L 7/52; B01L 3/50851; B01L 3/50273; B01L 2200/0673; B01L 2300/0841;
(Continued)

(56) References Cited

U.S. PATENT DOCUMENTS

2005/0064582 A1* 3/2005 Wittwer ................. C12Q 1/686
435/287.2
2005/0233324 A1* 10/2005 Corbett ............ C12Q 2523/313
435/6.11
(Continued)

FOREIGN PATENT DOCUMENTS

CN       201107269 Y    8/2008
CN       203048945 U    7/2013
(Continued)

OTHER PUBLICATIONS

Machine Translation of KR 20140029142 A (Year: 2021).*
Machine Translation of JP 2002126494 A (Year: 2021).*

*Primary Examiner* — Michael L Hobbs
(74) *Attorney, Agent, or Firm* — Leydig, Voit & Mayer, Ltd.

(57) ABSTRACT

A digital PCR device using centrifugal force. The present disclosure comprises: sample dish on which a microwell film having formed microwells is mounted; a door unit for inputting a sample while rotating the sample dish, and controlling the temperature of the sample which has been fractionated in the microwells by means of the centrifugal force and thus performing a PCR process; and a scan head unit for reading a fluorescent signal while rotating the sample which has been amplified in the microwells during the PCR process.

16 Claims, 5 Drawing Sheets

(52) U.S. Cl.
CPC ............... *B01L 2200/0673* (2013.01); *B01L 2300/0841* (2013.01); *B01L 2300/0864* (2013.01); *B01L 2300/0887* (2013.01); *B01L 2300/0893* (2013.01); *B01L 2300/1844* (2013.01); *B01L 2400/0409* (2013.01); *G01N 2021/6417* (2013.01); *G01N 2021/6441* (2013.01)

(58) Field of Classification Search
CPC ..... B01L 2300/0864; B01L 2300/0887; B01L 2300/0893; B01L 2300/1844; B01L 2400/0409; G01N 21/6428; G01N 21/07; G01N 35/00029; G01N 2021/6417; G01N 2021/6441; B01J 20/32
See application file for complete search history.

(56) References Cited

U.S. PATENT DOCUMENTS

| | | | |
|---|---|---|---|
| 2006/0091085 A1 | 5/2006 | Kobayashi et al. | |
| 2008/0166705 A1* | 7/2008 | Schwoebel | C12M 1/3461 |
| | | | 435/6.12 |
| 2008/0225295 A1 | 9/2008 | Symonds et al. | |

FOREIGN PATENT DOCUMENTS

| | | | | |
|---|---|---|---|---|
| JP | 2002-126494 A | | 5/2002 | |
| JP | 2002126494 A | * | 5/2002 | ............ B01J 19/00 |
| KR | 10-2012-0016934 A | | 2/2012 | |
| KR | 10-2014-0029142 A | | 3/2014 | |
| KR | 20140029142 A | * | 3/2014 | ............ C12M 1/38 |

* cited by examiner

# DIGITAL PCR DEVICE AND METHOD USING CENTRIFUGAL FORCE

CROSS-REFERENCE TO RELATED APPLICATIONS

This application is the U.S. national phase of the International Patent Application No. PCT/KR2018/000163 filed Jan. 4, 2018, which claims the benefit of Korean Patent Application No. 10-2017-0048901 filed Apr. 17, 2017, the entire content of which is incorporated herein by reference.

FIELD

The present disclosure relates generally to PCR device and method and, more particularly, to digital PCR device and method using centrifugal force.

BACKGROUND

Polymerase Chain Reaction (PCR) is a technique used to exponentially amplify a specific sequence of a nucleic acid of interest to generate thousands to millions of copies of this specific sequence via repeated cycles of heating and cooling a sample containing a nucleic acid of interest. In detail, PCR amplification occurs by a series of temperature enzyme reaction steps such as denaturation, annealing, and extension.

The first step in PCR is denaturation. At this step, double-stranded DNA is heated to separate into two single strands. Each strand of DNA serves as a template.

The second step in PCR is annealing, in which primers bind to the template DNA. At this step, the annealing temperature is an important factor in determining the accuracy of reaction. When the temperature is too high, the primers may bind too weakly to the template DNA, resulting in a reduction in amplified DNA product yield. When the annealing temperature is too low, undesirable DNA may be amplified due to nonspecific binding of the primers.

The third step in PCR is extension, in which a new strand of DNA is made by a thermostable DNA polymerase, such as Taq polymerase enzyme.

Meanwhile, a technique of diagnosing through nucleic acid amplification as described above or of searching for a specific gene has a limitation in that only a single template is detected at a time. It is a cumbersome and time-consuming task to amplify each template at a time under situations where multiple templates have to be amplified. For example, even when the same symptom reappears in the same patient, the cause of disease is often due to various kinds of infectious agents. Therefore, there is a need for individual diagnosis of various pathogens. In addition, it is known that cancer and genetic defects are caused by complex mutations of various genes.

Polymorphism or mutation of genes is caused by changes in loci of various genes, and thus testing of zygotes is additionally required. Due to the fact that the amount of a nucleic acid that can be extracted from a limited sample is finite in a general environment, it may be often impossible to repeat diagnosis through nucleic acid amplification using a limited amount of the nucleic acid.

Recently, digital PCR, a 3rd generation PCR technology, has emerged as an advanced testing technology that enables more accurate tests. However, current digital PCR devices is required to use a variety of devices or produce an expensive microwell chip in order to perform a test. In addition, a preparation process is troublesome or sensitive, and thus, there is a limit to expanding the base of digital PCR. Moreover, such complicated processes and methods also increase cost of test equipment, which is a serious obstacle to introduction of digital PCR.

SUMMARY

Accordingly, the present disclosure has been made keeping in mind the above problems occurring in the related art, and an objective of the present disclosure is to provide digital PCR device and method using centrifugal force, whereby a process of mounting a sample, a PCR process, and an analysis process can be easily performed using a single device at a low cost.

In order to accomplish the above objective, according to one aspect of the present disclosure, there is provided a digital PCR device using centrifugal force, the digital PCR device comprising: a sample dish on which a microwell film including microwells formed therein is mounted; a door unit configured to perform a PCR process by controlling a temperature of sample portions in the microwells when a sample is loaded onto the sample dish while the sample dish is rotated and is partitioned into the sample portions and loaded into the microwells by means of the centrifugal force; and a scan head unit reading out florescence signals while the sample portions amplified in the microwells in the PCR process is rotated.

The sample dish may include: a cylinder on which the microwell film is mounted; a cylindrical distribution cylinder provided inside the cylinder, and including grooves arranged at a regular interval such that the sample evenly spreads by the centrifugal force; and a cover covering the cylinder.

The microwell film may be mounted on an inner wall of the cylinder.

The cylinder and the microwell film may be made of transparent plastic or polymer.

When the sample portions in the microwells are rotated, a target substance having a higher specific gravity in the sample in which the target substance and an oil component are mixed may be transferred radially outward to a periphery of the sample dish, while the oil component having a lower specific gravity may be transferred to a center of the sample dish, whereby the microwells may be automatically sealed.

The door unit may include: a heater controlling a temperature of air; a fan moving the air; and a temperature sensor measuring the temperature of the air.

The digital PCR device may further include a protruded portion provided at a lower end of the door unit, and configured to spray the air in proximity to the hole of the sample dish.

The protruded portion may include a nozzle spraying the air.

The door unit may be configured to move up and down through a hinge, and the door unit may be placed and fixed to an upper portion of a support.

The hinge may be coupled to the support, and the support may be fixed to an upper portion of a lift.

The scan head unit may include a light emitting part and a light receiving part, and the scan head unit may be comprised of 1 to 10 independently installed units to generate two-dimensional images and data maps.

The digital PCR device may further include a lift configured to move the sample portions amplified in the microwells in the PCR process up and down.

The lift may move a supporting portion up and down to which a rotating unit rotating the sample dish is fixed.

The rotating unit may include: a mount fixing the sample dish; a motor rotating the mount; and an encoder controlling a rotation speed of the mount.

The digital PCR device may further include: a first base fixing the lift to a first upper side thereof; a second base on which the scan head unit is mounted; and a support rod fixed to a second upper side of the first base to support the second base.

According to another aspect of the present disclosure, there is provided a digital PCR method using centrifugal force, the digital PCR method comprising: mounting a sample dish to a mount and rotating the sample dish by a motor; loading a sample onto the rotating sample dish such that the sample is partitioned into sample portions and loaded into microwells of a microwell film mounted on an inner wall of the sample dish, by means of the centrifugal force; amplifying, by a door unit, the sample portions by performing a PCR process; and reading out, by a scan head unit, fluorescence signals of the amplified sample portions while rotating and moving the amplified sample portions up and down.

The digital PCR method may further include: generating, by the scan head unit, a two-dimensional image and a data map, by reading out the fluorescence signals of the sample portions.

As described above, according to the present disclosure, it is possible to perform the entire process of digital PCR using a single device, thus eliminating inconvenience of a user to move a sample from one device to another, and to perform automatic partitioning by means of centrifugal force, thus avoiding a cumbersome sample preparation process.

Furthermore, according to the present disclosure, it is possible to provide a device which is very cost competitive due to significantly simplified system structure, and to significantly reduce a cost burden on existing expensive consumable parts due to use of a polymer stamping process that enables mass production in terms of consumable parts.

Furthermore, according to the present disclosure, it is possible to freely control the number of microwells by controlling the size of a rotating cylinder and the size of the microwells according to a desired sensitivity or accuracy. Therefore, the present disclosure can be freely applicable to various devices from a high speed system to a high precision device.

BRIEF DESCRIPTION OF THE DRAWINGS

Various embodiments are illustrated in the drawings, in which.

DETAILED DESCRIPTION

Hereinbelow, exemplary embodiments will be described in detail with reference to the accompanying drawings such that the disclosure can be easily embodied by one of ordinary skill in the art to which this disclosure belongs. The present disclosure may, however, be embodied in many different forms and should not be construed as being limited to only the embodiments set forth herein. Further, it is to be noted that when the functions of conventional elements and the detailed description of elements related with the present disclosure may make the gist of the present disclosure unclear, a detailed description of those elements will be omitted.

A digital PCR device using centrifugal force according to an embodiment of the present disclosure will now be described.

Figure 1:
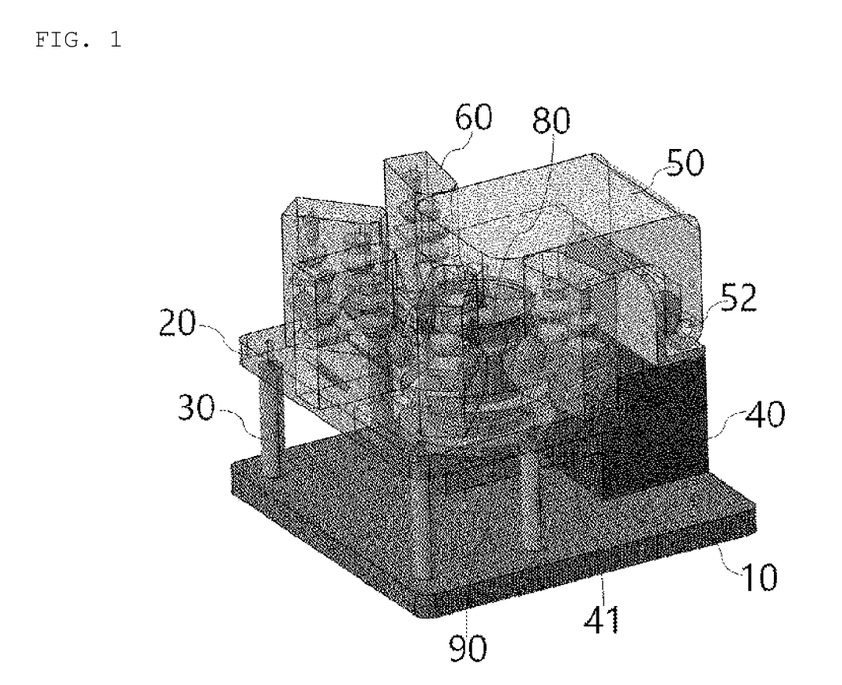
FIG. 1 is a perspective view showing a digital PCR device using centrifugal force according to an embodiment.
Figure 2:
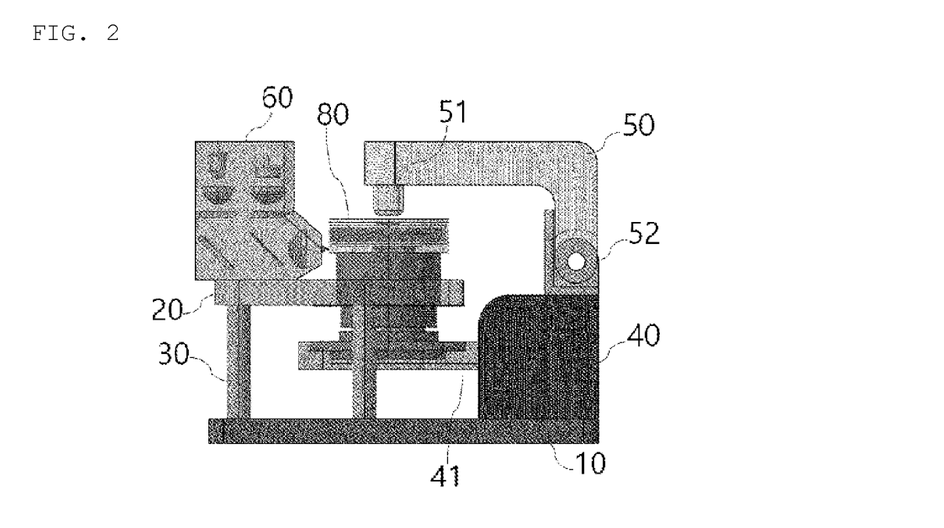
FIG. 2 is a sectional view showing the digital PCR device using the centrifugal force according to the embodiment.
Figure 3:
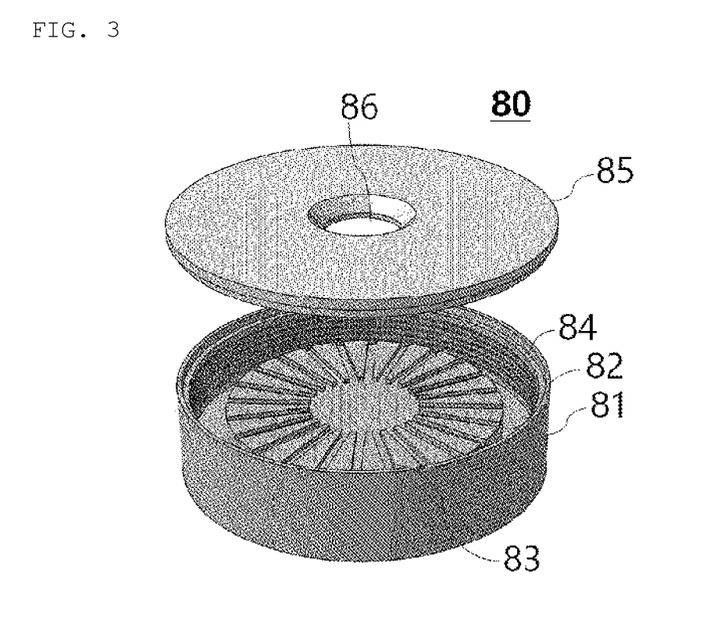
FIG. 3 is a perspective view showing a sample dish according to an embodiment.
Figure 4:
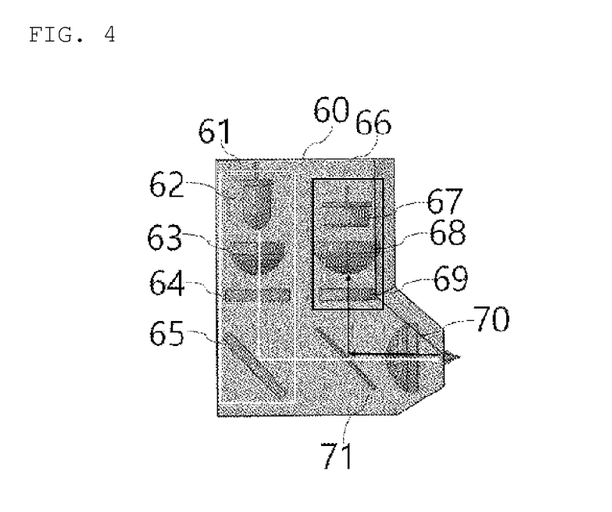
FIG. 4 is a sectional view showing a scan head unit according to an embodiment.
Figure 5:
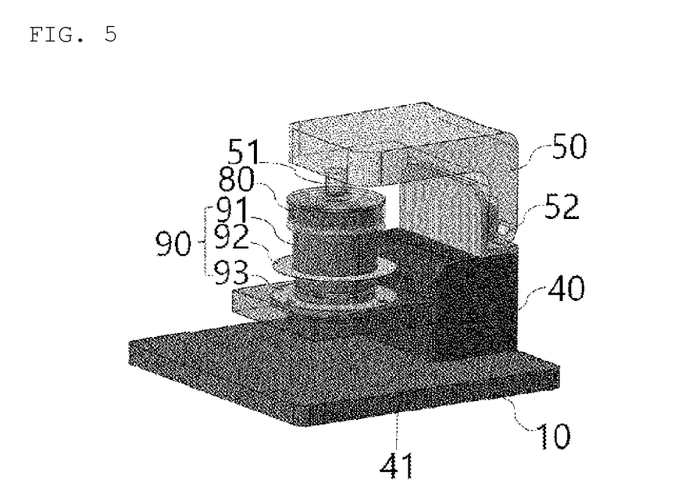
FIG. 5 is a perspective view showing a rotating unit according to an embodiment.

FIG. 1 is a perspective view showing a digital PCR device using centrifugal force according to an embodiment of the present disclosure, FIG. 2 is a sectional view showing the digital PCR device using the centrifugal force according to the embodiment of the present disclosure, FIG. 3 is a perspective view showing a sample dish according to an embodiment of the present disclosure, FIG. 4 is a sectional view showing a scan head unit according to an embodiment of the present disclosure, and FIG. 5 is a perspective view showing a rotating unit according to an embodiment of the present disclosure.

Referring to FIGS. 1 to 5, a digital PCR device using centrifugal force according to the present disclosure may include a sample dish 80 including microwells, a door unit 50 configured to perform a PCR process by heating a sample in the microwells, and a scan head unit 60 reading out a fluorescence signal while the sample amplified in the microwells in the PCR process is rotated.

The sample dish 80 comprises a cylinder 81, a cylindrical distribution cylinder 82 provided inside the cylinder 81 and including multiple grooves 83 arranged at a regular interval at a predetermined distance from the center thereof such that the sample evenly spreads by centrifugal force, a microwell film 84 mounted on an inner wall of the cylinder 81 and including the microwells formed therein, and a cover 85 covering the cylinder 81.

The cylinder 81 and the microwell film 84 may be made of transparent plastic or polymer so as to irradiate excitation light and sense emission light. Herein, the microwell film 84 is a flexible film capable of forming microwells of various sizes by means of a stamping process.

When the sample dish 80 is mounted on a mount 91, and then a prepared sample is loaded onto the sample dish through a hole 86 formed in the center of the cover 85 of the sample dish 80 while the sample dish 80 is rotated by a motor 93, the sample is partitioned into sample portions and loaded into the microwells of the microwell film 84 by means of the centrifugal force. Herein, as rotation proceeds, a target substance having a higher specific gravity in the sample in which the target substance and an oil component are mixed is transferred radially outward to the periphery of the sample dish, while the oil component having a lower specific gravity is transferred to the center of the sample dish, whereby each of the microwells is automatically sealed.

The door unit 50 comprises a heater controlling the temperature of air, a fan moving the air, and a temperature sensor measuring the temperature of the air. Herein, PID control is performed such that the temperature of the air is controlled to conform to a set target temperature, thus controlling the temperature inside the sample dish 80.

The door unit 50 comprises a protruded portion 51 provided at a lower end thereof, and configured to spray air in proximity to the hole 86 of the sample dish 80, with a nozzle provided therein for spraying the air.

Furthermore, the door unit 50 is configured to move up and down through a hinge 52. The door unit is placed and fixed to an upper portion of an "L"-shaped support 53. Herein, the support 53 is fixed to an upper portion of a lift 40, and the hinge 52 is coupled to the support 53.

When the protruded portion 51 is positioned in proximity to the hole 86 of the sample dish 80 and then the air is sprayed according to a set temperature while the sample portions in the microwells is rotated, the PCR process is performed. Herein, amplification of a gene individually occurs in each of the microwells in which the sample portions are confined.

The scan head unit 60 comprises a light emitting part 61 and a light receiving part 66. The scan head unit is configured to read out fluorescence signals of the sample portions while the sample portions (genes) amplified in the microwells in the PCR process is rotated and is slowly moved up and down by the lift 40.

Herein, the scan head unit 60 is comprised of 1 to 10 independently installed units to read out the fluorescence signals of the sample portions, thus generating 1 to 10 two-dimensional images and data maps. It is preferable that five independent scan head units 60 are installed in order to simultaneously obtain up to five fluorescence wavelengths. This allows each of the scan head units 60 to read out whether a target gene is expressed in each of the microwells, thus generating five two-dimensional images and data maps.

For example, when the microwell film 84 mounted on the inner wall of the sample dish 80 has 2 million (500 rows× 4000 columns) microwells, as a result of readout, images of five channels in which a total of 2 million microwells is observed are created. In this embodiment, information of 10 million (500 rows×4000 columns×5 channels) microwells can be extracted. Depending on the diameter of the cylinder 81 and the size of the microwells, microwells of various volumes may be provided.

Herein, the light emitting part 61 comprises a light source 62, a collimator 63, a band pass filter 64, a reflective mirror 65, a dichroic mirror 71, and a focusing lens 70. The light receiving part 66 comprises a photodiode 67, a condenser lens 68, a band pass filter 69, a dichroic mirror 71, and a focusing lens 70. Herein, the light emitting part 61 and the light receiving part 66 are conventional techniques already known and implemented in various ways before the present application. Therefore, a detailed description thereof will be omitted.

The lift 40 is configured to move a supporting portion 41 up and down, the supporting portion to which a rotating unit 90 rotating the sample dish 80 is fixed. Herein, the rotating unit 90 comprises the mount 91 fixing the sample dish 80, a motor 93 rotating the mount 91, and an encoder 92 controlling the rotation speed of the mount 91.

In the present disclosure, the lift 40 is fixed to a first upper side of a first base 10, and four support rods 30 are installed at a second upper side of the first base 10 to support a second base 20 on which 1 to 10 independent scan head units 60 are mounted.

Hereinafter, a digital PCR method using centrifugal force according to the present disclosure will be described.

First, a sample dish 80 is mounted on a mount 91 and then rotated by a motor 93.

Subsequently, when a prepared sample is loaded onto the sample dish through a hole 86 formed in the center of a cover 85 covering a cylinder of the sample dish 80, by means of centrifugal force, the sample is partitioned into sample portions and loaded into microwells of a microwell film 84 mounted on an inner wall of the sample dish 80. Herein, as rotation proceeds, a target substance having a higher specific gravity in the sample in which the target substance and an oil component are mixed is transferred radially outward to the periphery of the sample dish, while the oil component having a lower specific gravity is transferred to the center of the sample dish, whereby each of the microwells is automatically sealed.

Subsequently, a PCR process is performed according to a set temperature change configuration through the door unit 50 capable of temperature control to amplify the sample portions confined in the microwells. Herein, the PCR process is performed in such a manner that when the protruded portion 51 of the door unit 50 is positioned in proximity to the hole 86 of the sample dish 80 and then air that is temperature controllable is sprayed, gene amplification occurs in the microwells in which the sample portions are confined.

Next, while the supporting portion 41 is slowly moved up and down by the lift 40, with the amplified sample portions (genes) continuously rotated, fluorescence signals of the sample portions are read out by a scan head unit 60. Herein, each gene is processed such that a signal can be read out by fluorescence in advance. In this process, five independent scan head units 60, which irradiate excitation light of up to five wavelengths and read out emission light, read out whether a target gene is expressed in each of the microwells to generate five two-dimensional images and data maps.

In PCR methods in the related art, a PCR machine and a result analyzer are separately used, and thus changes in each temperature cycle cannot be measured. However, in the present disclosure, PCR results can be measured through continuous rotation during a PCR cycle.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A digital PCR device using centrifugal force, the digital PCR device comprising:
  a sample dish on which a microwell film including microwells formed therein is mounted, wherein the sample dish includes:
    a cylinder on which the microwell film is mounted;
    a cylindrical distribution cylinder provided inside the cylinder, and including grooves arranged at a regular interval such that the sample evenly spreads by the centrifugal force; and
    a cover covering the cylinder;
  a door unit configured to perform a PCR process by controlling a temperature of sample portions in the microwells when a sample is loaded onto the sample dish while the sample dish is rotated and is partitioned into the sample portions and loaded into the microwells by means of the centrifugal force; and
  a scan head unit reading out fluorescence signals while the sample portions amplified in the microwells in the PCR process is rotated.

2. The digital PCR device of claim 1, wherein the microwell film is mounted on an inner wall of the cylinder.

3. The digital PCR device of claim 1, wherein the cylinder and the microwell film are made of transparent plastic or polymer.

4. The digital PCR device of claim 1, wherein when the sample portions in the microwells are rotated, a target substance having a higher specific gravity in the sample in which the target substance and an oil component are mixed is transferred radially outward to a periphery of the sample dish, while the oil component having a lower specific gravity is transferred to a center of the sample dish, whereby the microwells are automatically sealed.

5. The digital PCR device of claim 1, wherein the door unit includes:
   a heater controlling a temperature of air;
   a fan moving the air; and
   a temperature sensor measuring the temperature of the air.

6. The digital PCR device of claim 5, further comprising:
   a protruded portion provided at a lower end of the door unit, and configured to spray the air in proximity to the hole of the sample dish.

7. The digital PCR device of claim 6, wherein the protruded portion includes a nozzle spraying the air.

8. The digital PCR device of claim 5, wherein the door unit is configured to move up and down through a hinge, and the door unit is placed and fixed to an upper portion of a support.

9. The digital PCR device of claim 8, wherein the hinge is coupled to the support, and the support is fixed to an upper portion of a lift.

10. The digital PCR device of claim 1, wherein the scan head unit includes a light emitting part and a light receiving part, and the scan head unit is comprised of 1 to 10 independently installed units to generate two-dimensional images and data maps.

11. The digital PCR device of claim 1, further comprising:
    a lift configured to move the sample portions amplified in the microwells in the PCR process up and down.

12. The digital PCR device of claim 11, wherein the lift moves a supporting portion up and down to which a rotating unit rotating the sample dish is fixed.

13. The digital PCR device of claim 12, wherein the rotating unit includes:
    a mount fixing the sample dish;
    a motor rotating the mount; and
    an encoder controlling a rotation speed of the mount.

14. The digital PCR device of claim 11, further comprising:
    a first base fixing the lift to a first upper side thereof;
    a second base on which the scan head unit is mounted; and
    a support rod fixed to a second upper side of the first base to support the second base.

15. A digital PCR method using centrifugal force, the digital PCR method comprising:
    mounting a sample dish to a mount and rotating the sample dish by a motor, wherein the sample dish includes:
        a cylinder on which the microwell film is mounted;
        a cylindrical distribution cylinder provided inside the cylinder, and including grooves arranged at a regular interval such that the sample evenly spreads by the centrifugal force; and
        a cover covering the cylinder;
    loading a sample onto the rotating sample dish such that the sample is partitioned into sample portions and loaded into microwells of a microwell film mounted on an inner wall of the sample dish, by means of the centrifugal force;
    amplifying, by a door unit, the sample portions by performing a PCR process; and
    reading out, by a scan head unit, fluorescence signals of the amplified sample portions while rotating and moving the amplified sample portions up and down.

16. The digital PCR method of claim 15, further comprising:
    generating, by the scan head unit, a two-dimensional image and a data map, by reading out the fluorescence signals of the sample portions.

* * * * *